United States Patent [19]

Ficken et al.

[11] Patent Number: 4,962,867

[45] Date of Patent: Oct. 16, 1990

[54] AUXILIARY ARTICLE DISPENSER FOR VENDING MACHINES

[75] Inventors: Leonard A. Ficken; Robert L. Stadler, both of St. Louis County, Mo.

[73] Assignee: Unidynamics Corporation, New York, N.Y.

[21] Appl. No.: 259,860

[22] Filed: Oct. 19, 1988

[51] Int. Cl.[5] .............................................. B65G 59/00

[52] U.S. Cl. .................................... 221/130; 221/232; 221/242; 221/261

[58] Field of Search ............... 221/124, 129, 130, 131, 221/133, 151, 195, 279, 281, 192, 193, 232, 228, 242, 247, 250, 258, 261

[56] References Cited

U.S. PATENT DOCUMENTS

| | | | |
|---|---|---|---|
| D. 156,154 | 11/1949 | Otto | 52/3 |
| D. 182,015 | 2/1958 | Caruso | 52/3 |
| D. 201,299 | 6/1965 | Moore | 52/3 |
| D. 283,827 | 5/1986 | Albright | 20/4 |
| D. 283,903 | 5/1986 | Albright | 20/4 |
| 3,360,091 | 12/1967 | Baum | 221/242 |
| 3,542,244 | 11/1970 | Dyer et al. | 221/232 |
| 3,797,701 | 3/1974 | Allocco et al. | 221/155 |
| 4,336,892 | 6/1982 | Cox et al. | 221/232 |
| 4,679,684 | 7/1987 | Glaser | 194/350 |
| 4,730,750 | 3/1988 | Ficken | 221/129 |

FOREIGN PATENT DOCUMENTS

| | | | |
|---|---|---|---|
| 1017392 | 10/1957 | Fed. Rep. of Germany | 221/232 |

*Primary Examiner*—H. Grant Skaggs
*Attorney, Agent, or Firm*—Senniger, Powers, Leavitt & Roedel

[57] ABSTRACT

An auxiliary dispenser for a merchandise vending machine of the type comprising a cabinet, a delivery bin at the front of the cabinet, near the bottom, and a merchandise dispensing apparatus in the cabinet above the bin for dispensing merchandise to the bin, the dispenser adapted to be mounted behind the bin, below the dispensing apparatus. The dispenser comprises a bank of at least one generally inverted-J shaped magazine for holding articles. The bank is preferably pivotally mounted at its upper end to pivot upwardly to facilitate filling. Each magazine has a generally vertically extending straight portion and a forwardly extending curved dispensing portion. A spring-biased guide member urges articles in the magazine upwardly toward the curved dispensing portion, the guide member can be releasably locked at the end of the magazine to facilitate filling. An ejector member is mounted for reciprocal motion generally transverse to the magazine to push an article upwardly out an opening in the top of the magazine. The ejector member is connected with a linkage to an eccentric drive member on a motor to reciprocate. The ejector member may be provided with a gripping surface to pull articles displaced when another article is ejected back into the magazine.

10 Claims, 8 Drawing Sheets

FIG. 7.
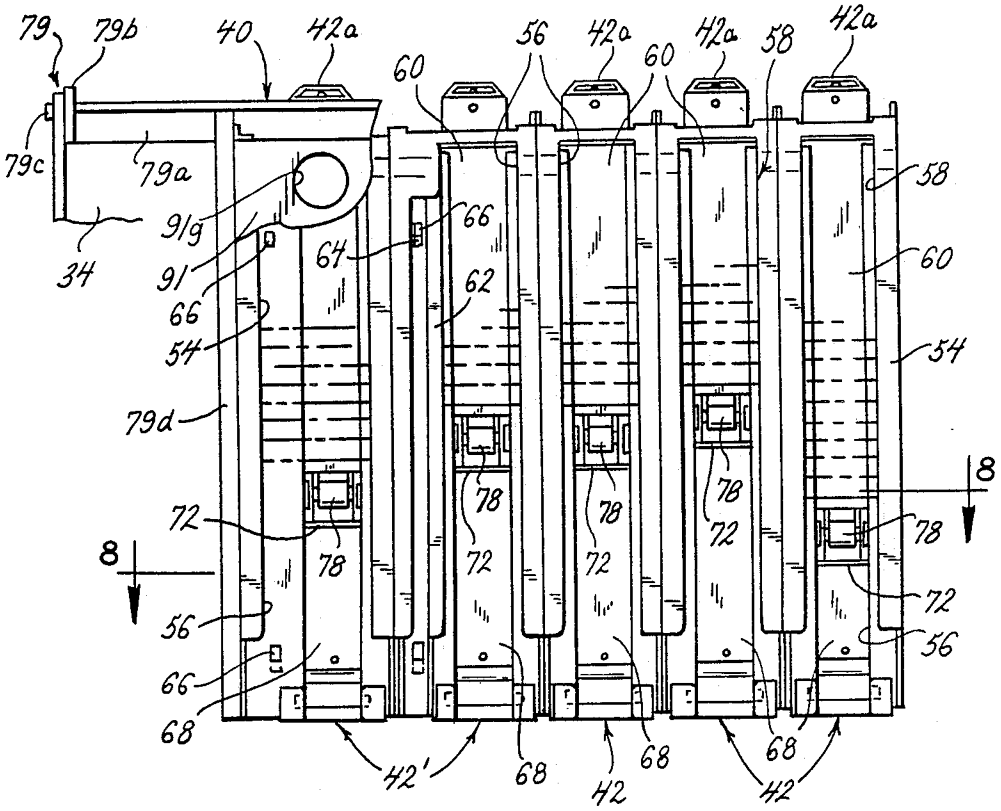
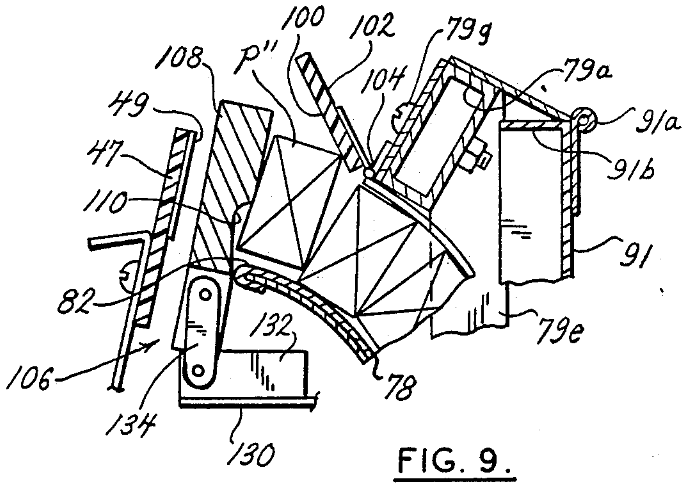
FIG. 9.

AUXILIARY ARTICLE DISPENSER FOR VENDING MACHINES

BACKGROUND OF THE INVENTION

This invention relates to vending machines and in particular to an auxiliary dispenser for vending machines for dispensing gum and mints and similar articles.

The vending machines now in use typically comprise a cabinet, a merchandise delivery bin at the front of the cabinet, and means inside the cabinet above the bin for dispensing merchandise to the bin when a customer deposits money and makes a selection. The bin is typically positioned conveniently above the bottom of the cabinet for easy access by the customer to remove merchandise from the bin. This results in some empty or "dead" space behind the bin and below the merchandise dispensing means.

SUMMARY OF THE INVENTION

It is among the objects of the present invention to provide an auxiliary merchandise dispenser of compact construction adapted to fit behind the merchandise dispensing bin and below the merchandise dispensing means in a vending machine. It is also among the objects of this invention to provide such a dispenser that dispenses merchandise into the bin; to provide such a dispenser that swings out with the door of the vending machine for easy access to the dispenser; to provide such a dispenser that is easy to load; to provide such a dispenser that displays the article that is dispensed; to provide such a dispenser that is adaptable to dispense merchandise of different sizes; and to provide such a dispenser that is of simple construction and reliable operation.

The auxiliary dispenser of the present invention is adapted to be mounted behind the merchandise delivery bin and below the merchandise dispensing means in the cabinet of a vending machine. The dispenser generally comprises a bank of generally inverted-J shaped magazines for holding articles, mounted at the back of the bin below the dispensing means. Each magazine has means for urging articles in the magazine toward the top of the magazine, means for ejecting the top-most article in the magazine from the top of the magazine, and means for pushing an article ejected from the top of the magazine generally forwardly into the bin.

The dispenser bank is preferably pivotally mounted at its upper end in the cabinet so that the bank can be pivoted upwardly about a generally horizontal axis to raise the free ends of the magazines to facilitate filling the magazines through their free ends. A collapsible support can be provided to support the bank while the magazines are being filled. The back of the bank can also be used as a shelf when filling the rest of the machine.

As noted above, each magazine preferably has an inverted-J shape, with an elongate generally vertical portion and a curved forwardly extending dispensing portion. The dispenser is particularly adapted for dispensing standard sized packs of gum and roll candy and mints, and the dispenser can also accommodate "theatre" size roll candy. The magazines can be made of different sizes and/or inserts may be provided to adjust the sizes of the magazines to accommodate different sized articles. Each magazine has means, such as a spring-biased guide member for urging articles in the magazine upwardly toward the curved dispensing portion.

The upper end of the magazine is closed with a clear window to display the top most article in the magazine (which is the article that will be dispensed next). There is an opening in the top of the curved dispensing portion of each magazine which is closed by a spring-biased flap member. An ejector means urges articles upwardly out of the magazine through the opening. The ejector means preferably comprises an ejector member associated with each magazine. Each ejector member is connected via a linkage to a motor mounted in the vending machine so that the ejector member reciprocates in an upward stroke from a starting position below the topmost article in the magazine perpendicularly through the magazine to eject the article from the top of the magazine, and a downward stroke back to its starting position. The spring biased flap member operates to push the article ejected from the magazine forwardly into the bin.

Sometimes the articles being dispensed from the magazine adhere to one another, and when the ejector member operates it not only ejects the top-most article, but also displaces the adjacent article. The flap member helps to retain the adjacent article in the magazine. Furthermore, the ejector member may be provided with gripping means, such a concave gripping surface, for releasably engaging the displaced article and pulling the article back into the magazine on the downward stroke of the ejector member.

The dispenser is of compact construction and fits in the space behind the merchandise delivery bin and below the merchandise dispensing means in a vending machine. The dispenser ejects the articles and pushes them into the bin. The dispenser is adapted to be mounted on the door of the vending machine, so that it swings out of the machine for easy access, particularly during loading. The pivotal mounting of the bank allows the magazines to be pivoted upwardly to facilitate filling them. The guide members can also be locked in a retracted position during loading to facilitate filling the magazines. The magazines can be made of different sizes and/or inserts can be used to allow the magazines to handle articles of different sizes. The dispenser is of simple construction and reliable operation.

These and other advantages will be in part apparent and in part pointed out hereinafter.

BRIEF DESCRIPTION OF THE DRAWINGS

FIG. 7 is a rear elevation view of the bank of magazines, with portions of the cover and mounting frame broken away to show the structure of the magazines;

FIG. 9 is an enlarged view of the dispensing portion of one of the magazines.

Corresponding reference numerals indicate corresponding parts throughout the several views of the drawings.

DETAILED DESCRIPTION OF THE PREFERRED EMBODIMENT

Figure 1:
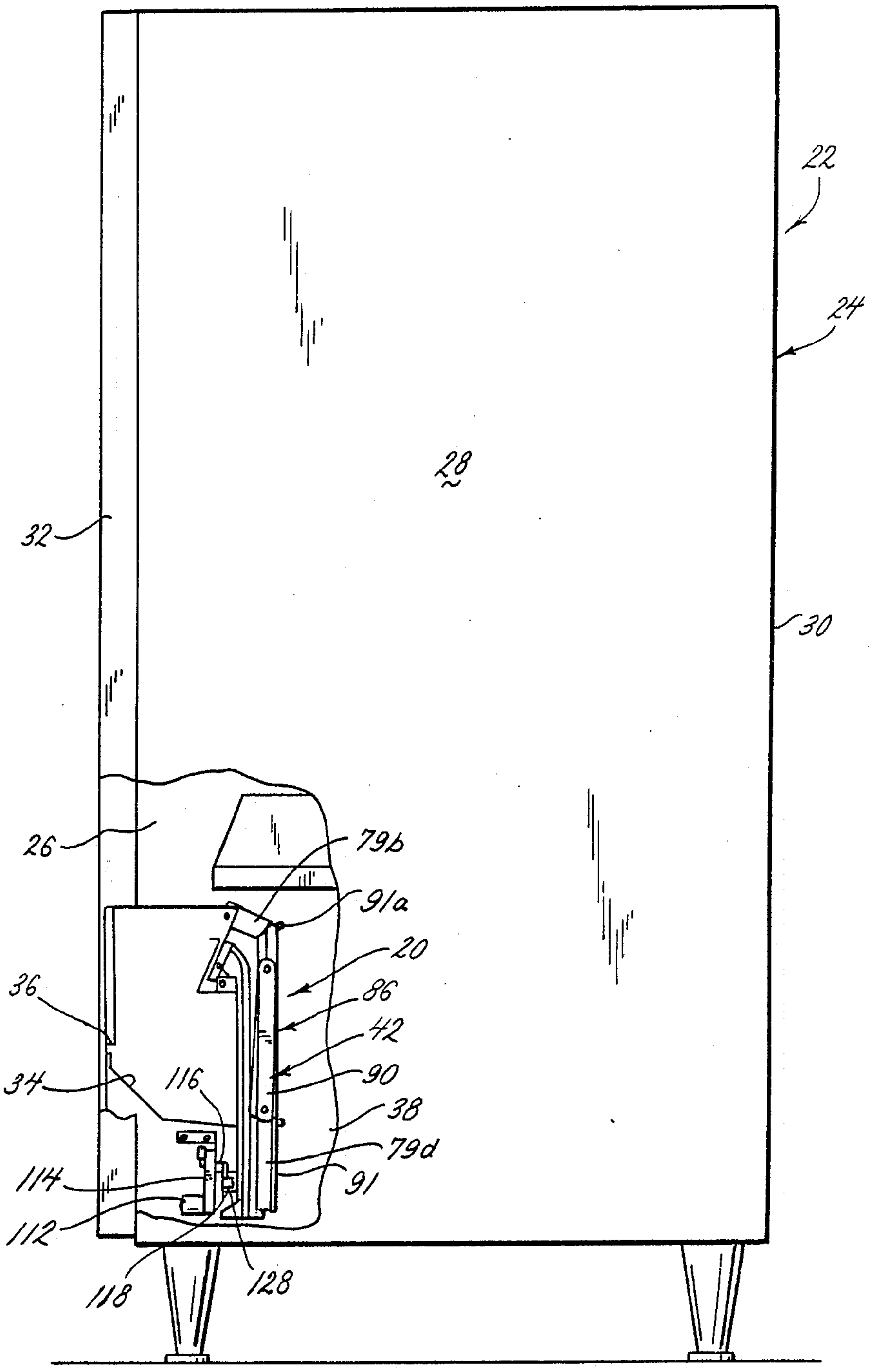
FIG. 1 is a side elevation view of a vending machine with a portion broken away to show an auxiliary dispenser constructed according to the principles of this invention as it would be mounted in the machine.

An auxiliary merchandise dispenser constructed according to the principles of the present invention, indicated generally as 20, is shown in FIG. 1 as it would be mounted in a vending machine 22. The vending machine 22 is a typical vending machine comprising a cabinet 24 having opposing sides 26 and 28, a back 30, and a door 32 hingedly mounted over the front. The vending machine 22 has a merchandise delivery bin 34 at the front of the cabinet 24, accessible through an opening 36 in the door 32. The bin 34 is preferably mounted on the door 32. The vending machine 22 also comprises means (shown in phantom in FIG. 6) inside the cabinet above the bin 34, for dispensing merchandise to the bin. The vending machine 22 has an open space 38 behind the bin 34 and below the dispensing means.

As is well known in the art, the vending machine 22 has credit means (not shown) for registering credit from a purchaser. This means may comprise, for example, a coin slot and coin validator, although some alternative means may be provided. The vending machine also comprises selection means (not shown) operable upon the registration of sufficient credit, for allowing the purchaser to make a selection. The selection means includes control means (not shown) for causing the dispensing means to dispense the selected merchandise to the bin 34. As described below, the selection means can also cause the auxiliary dispenser 20 of the present invention to dispense articles to the bin 34.

Figure 2:
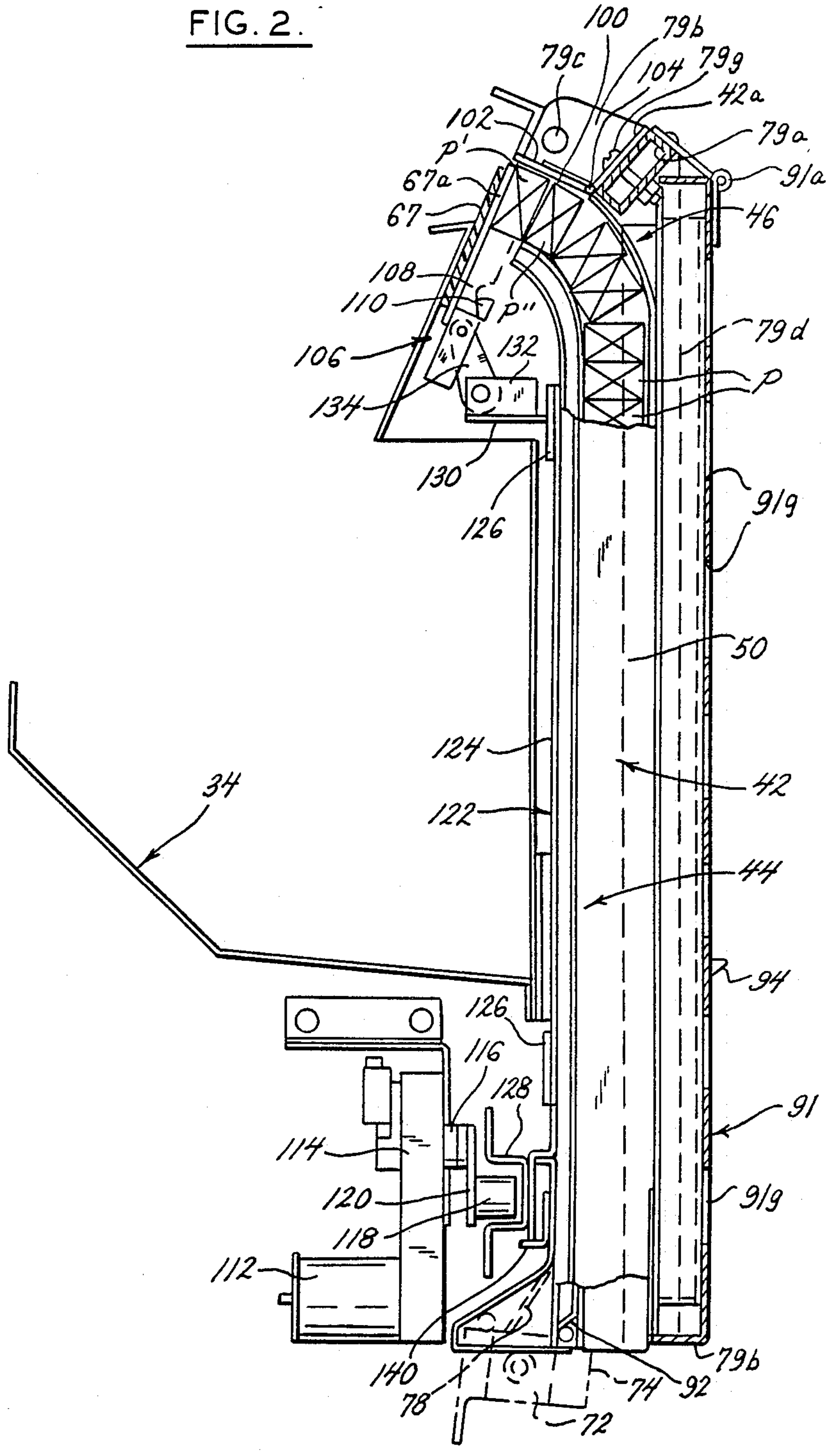
FIG. 2 is an enlarged side elevation view of the auxiliary dispenser, with portions of the side wall broken away.
Figure 3:
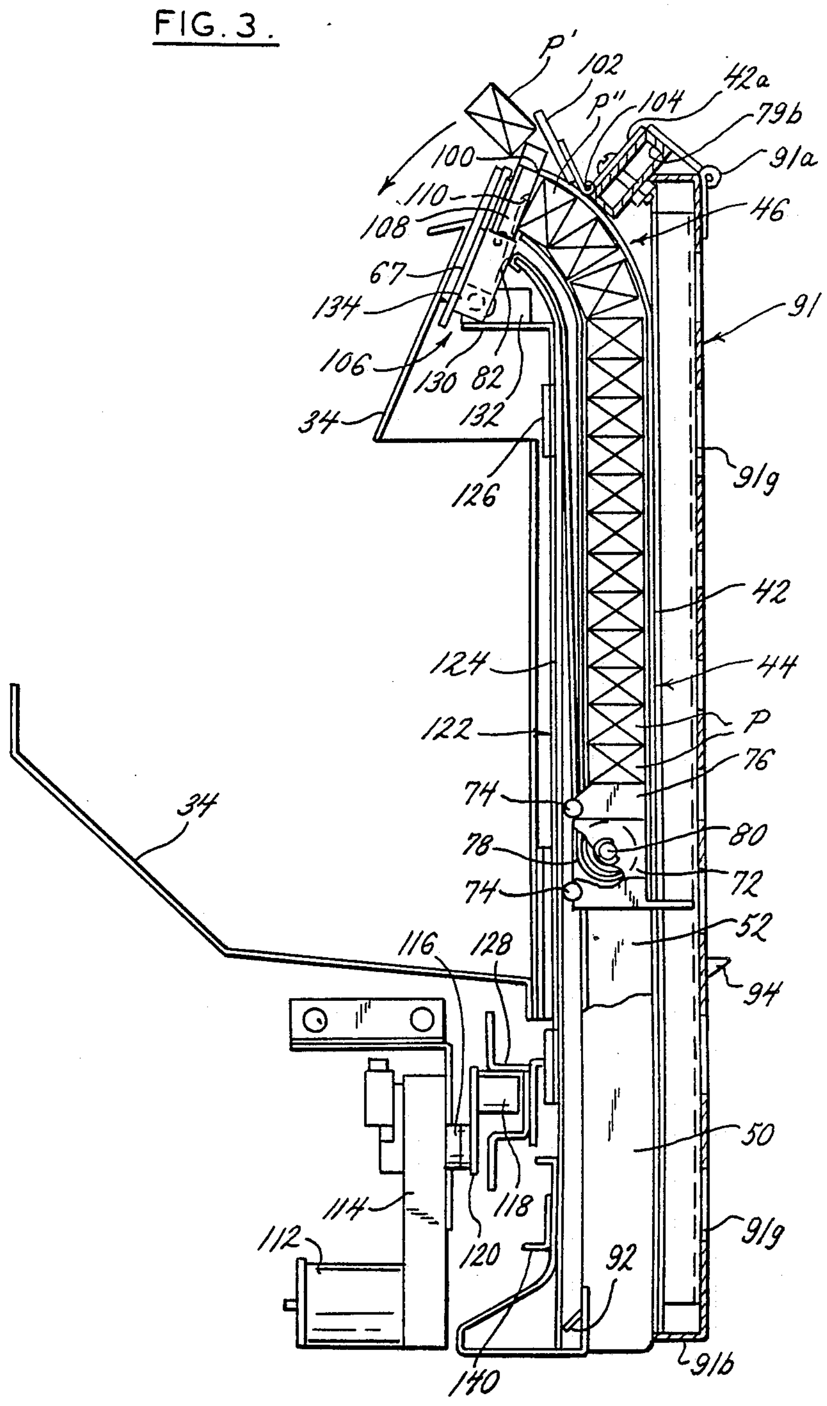
FIG. 3 is an enlarged side elevation view of the auxiliary dispenser, with portions of the side wall broken away, showing an article being dispensed from dispenser.
Figure 4:
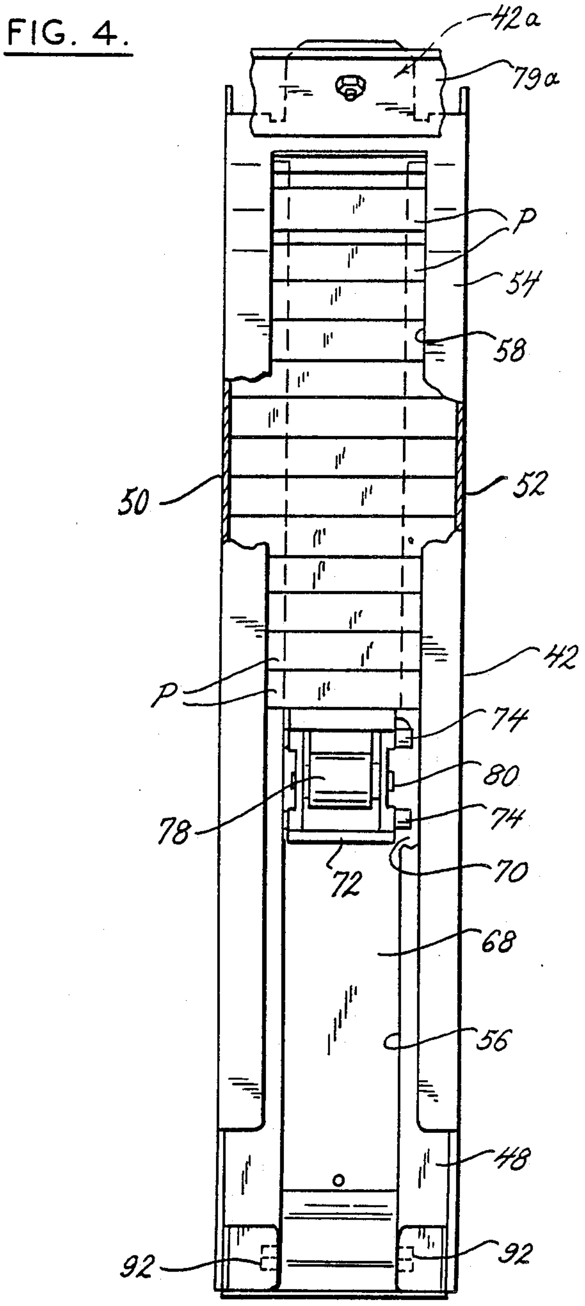
FIG. 4 is an enlarged rear elevation view of one of the magazines of the dispenser.
Figure 8:
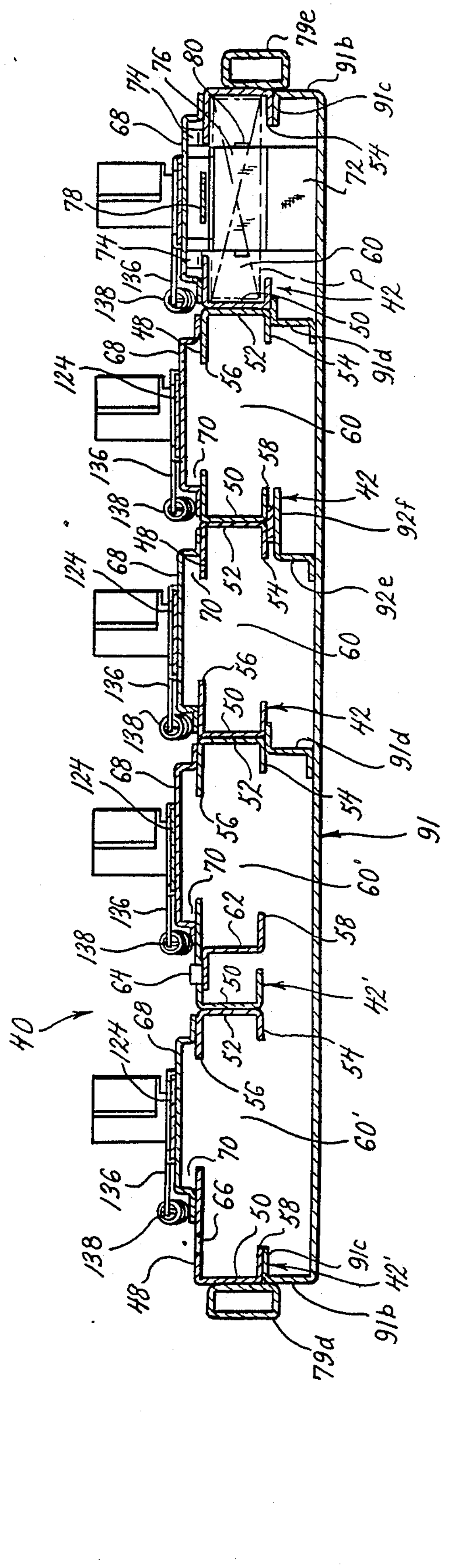
FIG. 8 is a cross-sectional view of the bank of magazines, taken along the plane of line 8—8 in FIG. 7, with the cover in place.

The auxiliary dispenser 20 comprises a bank 40 of inverted-J shaped magazines 42 secured together in side-by-side relationship. These magazines 42 are all of similar construction, however, as illustrated in FIGS. 7 and 8, two of the magazines, identified as 42', are of different size, as described below. Portions of magazines 42' that differ from the magazines 42 are identified with a "'". In side elevation (see FIGS. 2 and 3), each of the inverted-J shaped magazines comprises a vertical generally straight portion 44 and a forwardly extending curved dispensing portion 46.

The magazines 42 and 42' are preferably constructed from sheet metal. As best shown in FIG. 8, each magazine 42 comprises a front wall 48, opposing left and right side walls 50 and 52, and a rear wall 54. The front wall 48 has an elongate opening 56 extending substantially the length of the magazine. The rear wall 54 has an elongate opening 58 extending substantially the length of the magazine. Each magazine defines a passage 60 for receiving the articles to be dispensed. In this preferred embodiment, the passages 60 are adapted to receive standard sized packs of chewing gum P or roll candy or mints, although the passages 60 could be constructed to receive other merchandise. The passages may be constructed of different sizes to accommodate different sized goods, for example as shown in FIGS. 7 and 8, the two magazines 42' on the left side of bank 40 have passages 60' that are wider than the passages 60 of the other magazines 42 to accommodate wider articles, for example "theatre-size" packages of candy or mints. An insert 62 can be secured in the passages 60' to change the effective size of the passages 60' to accommodate smaller sized articles. The inserts 62 may be removably installed in the passages 60' by engaging hook-shaped tabs 64 on the insert in openings 66 in the fronts of the magazines 42'.

The upper ends of the magazines 42 and 42' in bank 40 are covered with an elongate clear window 67 extending across the entire bank, made from Lexan TM or some other suitable clear material such as glass or plastic. The widow 67 displays the top-most article in each of the magazines 42 and 42', which is the next article that will be dispensed from each magazine. Thus customers can see the actual article that they are purchasing. The rear face of the window 67 has vertically extending lands **67*a* for engaging the articles in the magazines to reduce friction between the articles and the window 67 and to protect the window 67** from being scratched as articles are ejected from the magazines. The lower ends of the magazines are open for loading articles in the magazines.

A shallow channel member 68 is mounted over the front of each magazine 42. The shallow channel member 68 and the front 48 of each magazine 42 define a track 70 in front of the magazine. A guide member 72 having rollers 74 projecting into the track 70, is slidably mounted in each magazine, extending through the opening 56 in the front 48 and through the opening 58 in the back 54. The guide member 72 has an abutment member 76 that projects into the passage 60 for engaging the article in the magazine. Means, such as a spiral spring 78, biases the guide member 72 upwardly to urge the packs P in the passage 60 upwardly toward the dispensing portion 46 of the magazine 42, and against the window 67. The abutment member may have a sign or symbol, such as "sold out" thereon, which will be visible in the window 67 when all of the articles in the magazine have been dispensed. The spiral spring 78 is preferably spooled on an axle 80 in the guide member 72, with one end of the spring 78 being secured to the top of the magazine 42 generally at 82. The tendency of springs 78 to coil, pulls the guide members 72 upwardly in their respective magazines, to urge the packs P upwardly in the magazines.

The bank 40 of magazines is received in a frame 79 (see FIG. 7) for pivotal mounting on the door 32, behind the bin 34. The frame 79 comprises an elongate hollow bar **79*a*, of rectangular cross-section, extending generally horizontally across the bin 34. An end plate 79*b* is mounted at each end of bar 79*a*, and has a hole 79*c* therein by which the frame 79 is pivotally mounted between the sidewalls of the bin 34. Left and right supports 79*d* and 79*e* depend perpendicularly from the bar 79*a*, from points spaced inwardly (see FIG. 7) of the ends of the bar 79*a*. The bank 40 is mounted below bar 70*a* and between the bars 79*d* and 79*e*. The top of each magazine may have a tongue 42*a* projecting upwardly therefrom, which is attached to the bar 79*a*, for example with screws 79*g*, to secure the bank 40 to the frame 79. In addition, the bank 40 may be releasably attached to the left and right supports 79*d* and 79*e*. The bank 40 is preferably removable from the frame 79** for servicing.

Figure 6:
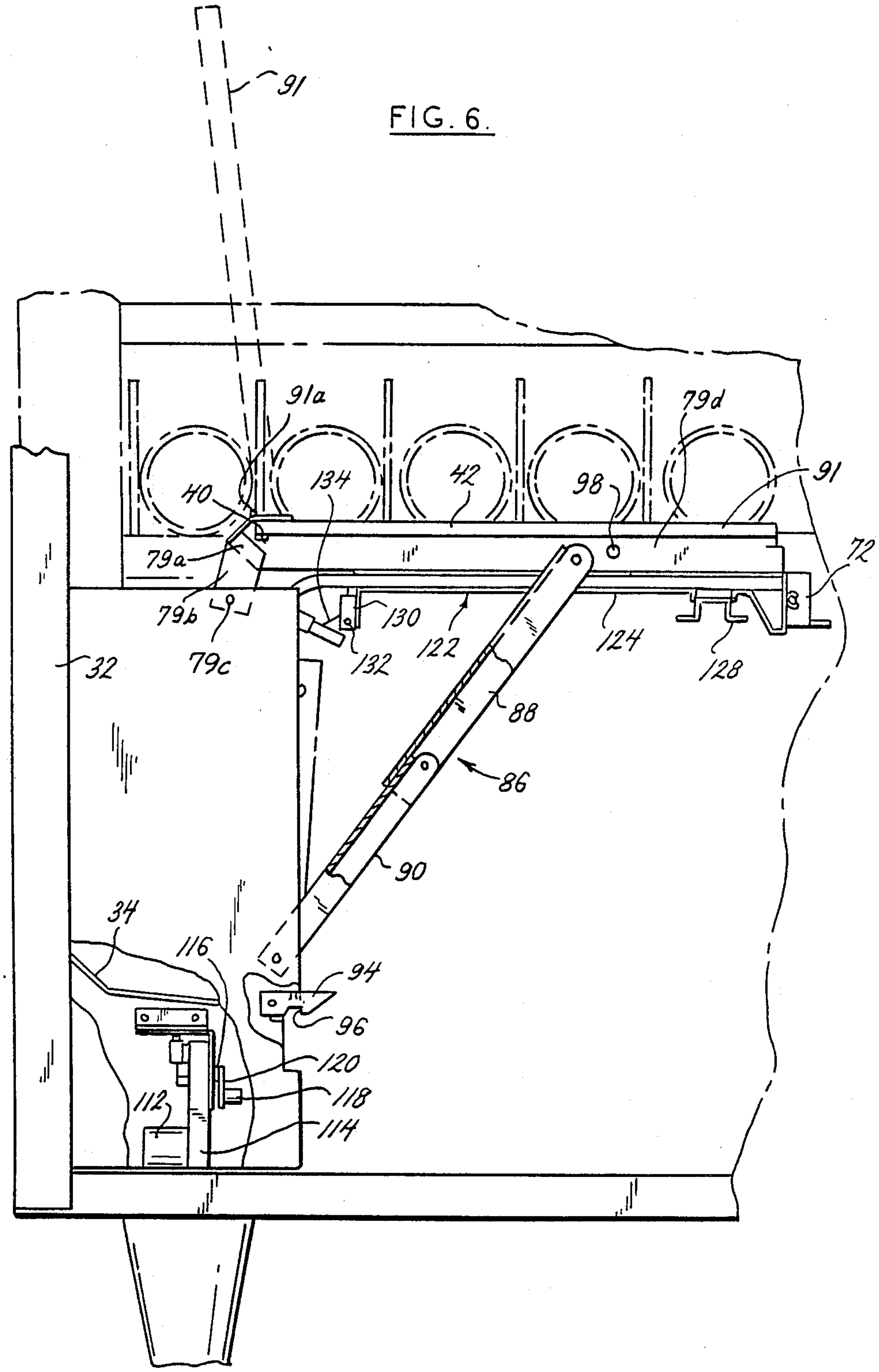
FIG. 6 is a side elevation view of the bank of magazines pivoted upwardly, with the collapsible support locked to hold the dispenser up, and showing the hinged cover in phantom in its raised position.

The frame 79 pivotally mounts the bank 40 in position so that the forwardly extending curved portions 46 of the magazines extend over the top edge of the back of the bin 34, and the straight portions 44 of the magazines extend generally vertically behind the bin 34. Because of this pivotal mounting, the bank 40 can be pivoted about its upper end to raise the lower or free ends of the magazines. A collapsible support, such as hinged brace 86 (FIG. 6) can be provided to temporarily support the bank 40 in its raised position to facilitate the filling of the magazines. As best shown in FIG. 6, the hinged brace 86 comprises an upper member 88 pivotally mounted at one end to one of the bars **79*d* or 79*e* receiving the bank 40, and a lower member 90 pivotally mounted at one end to a portion of the door 32. The free ends of the upper and lower members 88 and 90 are pivotally mounted together. The upper and lower members 88 and 90 are configured to releasably lock in an over-center position to support the bank 40** with the magazines extending generally horizontally.

A cover 91 is hingedly mounted over the back of the bank 40 so that when the bank 40 is in its raised position it can be used as a shelf for holding cartons of articles for loading in the vending machine. The cover is hingedly mounted with piano-hinge **91*a* (see FIGS. 2, 3 and 6) to the top of the bar 79*a*. The cover 91 can thus be lifted (as shown in phantom in FIG. 6) to access the back of the magazines, to remove the guide members 72 and to fill the magazines. The cover 91 has edge flanges 91*b* with inwardly turned lips 91*c*. A plurality of elongate spacers 91*d* (FIG. 8), having a Z-shaped cross-section, are secured on the underside of the cover 91 to spaced the cover from the backs of the magazines. The spacers are positioned so that they abut the backs of the magazines. The cover 91 also includes a support 91*e*, also having a Z-shaped cross-section, mounting a magnet 91*f* for releasably securing the cover to the backs of the magazines. The cover 91 can have openings 91*g*** for reducing the weight of the cover.

With the front door 32 of the vending machine open and the bank 40 supported by the hinged brace 86 in its generally horizontal position, the magazines are conveniently filled by raising cover 91 and pulling the guide members 72 to the bottoms of their respective tracks 70, and out of the passages 60 (FIG. 6). As shown in phantom in FIG. 2, the rollers 74 can be engaged in catches 92 at the bottoms of the tracks to hold the guide members 72 out of the passages while articles, such as packs P, are loaded into the magazines. The catches 92 constitute a means for releasably engaging the guide members 72. When the filling is completed, the rollers 74 are disengaged from the catches 92, and the guide members 72 are allowed to slide upwardly in the tracks 70 until the abutment members 76 engage the packs P in the passages 70 of the magazines.

The hinged brace 86 is then collapsed and the bank 40 permitted to pivot downwardly to its operational position. The bank 40 can be secured in this operational position with a latch 94 (FIG. 6) pivotally mounted on a portion of the door 32 (such as the side of bin 34). The latch 94 has a catch 96 adapted to engage a pin 98 projecting from the side of the bank 40. Alternatively, the bank can be secured in its operational position with magnets (not shown), or some other means.

The forwardly extending upper portion 46 of each magazine has an opening 100 at the top for the ejection of the packs P held in the magazines. The opening 100 is closed by a flap member 102, which is pivotally mounted on the magazine rearwardly of the opening 100, and biased forward with spring 104 to close the opening 100. Flap member 102 is preferably made of plastic, and is generally U-shaped and hinged at the bottom of the "U". Each magazine includes ejector means 106 for ejecting the top-most forward-most pack P′ in the magazine upwardly through the opening 100. The ejector means 106 comprises an ejector member 108, positioned below the top-most, forward-most pack P′ in the magazine. The ejector member 108 is slidably mounted for reciprocating in an upward stroke to eject a pack P′ from the magazine and a downward stroke to return to its starting position. In the upward stroke, ejector member 108 moves upwardly from its starting position below the magazine through the magazine in a generally vertical plane perpendicular to the magazine to push the pack P′ upwardly through the opening 100 and out of the magazine. In the downward stroke the ejector member 108 returns to its starting position. The spring-biased guide member 72 urges the next pack P″ into the space above the ejector member previously occupied by the ejected article.

As the pack P′ is pushed upwardly out of the magazine, it pushes flap 102 open against the bias of the spring 104. When the ejector member 108 has ejected the pack P′ free from the magazine, the flap 102, under the bias of the spring 104, pushes the pack forward into the bin 34.

Sometimes, the packs P being dispensed from the magazine will adhere to one another, and as the ejector member 108 ejects a pack P′, it also displaces the next adjacent pack P″ at least partially out of the magazine. The flap 102 tends to retain this adjacent pack, preventing its ejection from the magazine. The ejector member 108 preferably has gripping means, for example concave gripping surface 110, adapted to releasably engaging the displaced pack P″ and pull it back into the magazine. (See FIG. 9). The gripping surface 110 engages the side wall on lower corner of the pack P″. The concave gripping surface 110 is configured so that once the pack has been pulled back into the magazine and is firmly seated against the front 48 of magazine, the gripping surface 110 cams out of engagement with the pack, so that the engaging member can continue to fully retract to its starting position under the magazine, without damaging the pack P″. By virtue of its configuration, the gripping surface 110, also constitutes a camming means for disengaging the packs or other articles being dispensed.

The dispenser 20 also comprises means for reciprocating each ejector member 108. This means preferably comprises an electric motor 112 for each magazine, mounted on the door 32. Each motor 112 drives a gear box 114 having an output shaft 116 extending generally rearwardly. An eccentric drive member, such as roller 118 is mounted on the drive shaft 116 with a crank arm 120 so that as the motor 112 turns, the eccentric drive member 118 orbits in an circular path. Means, such as linkage 122 connects the drive member 118 with the ejector member 108, to reciprocate the ejector member. The selection means of vending machine 22 controls motor 112, energizing motor 112 for sufficient time to cause eccentric drive member 118 to make one full circle.

The linkage 122 comprises an elongate plate 124 slidably mounted on the front of each magazine. The plate 124 is held against the front of the shallow channel member 68 with tabs 126. A channel member 128 is attached to the lower end of plate 124. The channel member 128 extends transversely with respect to plate 124 and its respective magazine, and faces generally forwardly to receive the eccentric drive member 118. The channel member 128 easily engages and disengages eccentric drive member 118, thereby permitting the bank 40 to be pivoted up and down without any elaborate steps to disconnect and connect the linkage 122 to the drive member. The channel 128 also transmits the vertical movement of drive member 118 to the ejector member 108 while accommodating the lateral movement of the drive member 118 resulting from its orbital motion. The channel member 128 allows the drive member to translate laterally therein (for example by rolling), while the drive member remains in contact with the channel member to transmit vertical motion to the channel member. A generally horizontal extension 130 extends perpendicularly rearwardly from the top of the plate 124, and an ear 132 extends upwardly, perpendicular to extension 130. A link 134 is pivotally mounted at one end to the ear 132 and at the other end to the ejector member 108, thereby transferring motion from the plate 124 to the ejector member 108.

Figure 5:
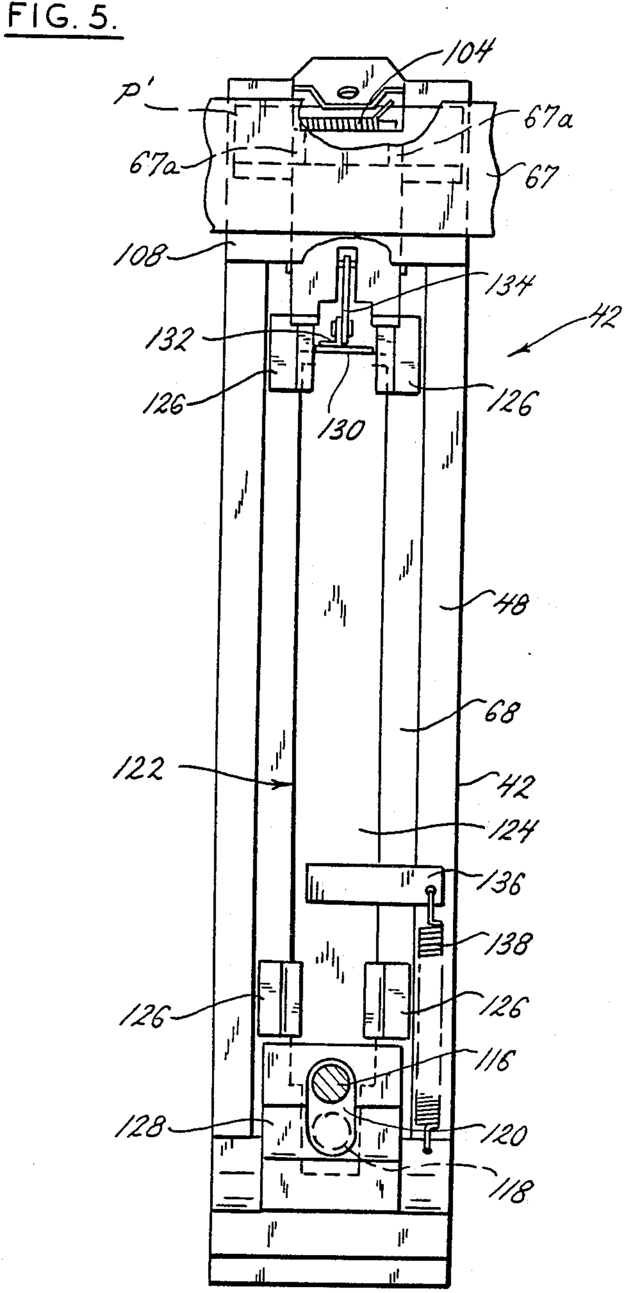
FIG. 5 is an enlarged front elevation view of one of the magazines of the dispenser.

An arm 136 (FIG. 5) extends laterally from the back of each plate 124. One end of a coil spring 138 is secured to the free end of the arm 136, and other end of the spring is anchored to the base of the magazine. The coil springs 138 thus apply a restorative force on the linkages 122, tending to pull the ejector member 108, downwardly. An L-shaped stop 140 (FIGS. 2 and 3) is mounted on the back of each magazine to engage the lower end of the plate 124, to limit retraction of the linkage 122.

OPERATION

In operation, the dispenser 20 is filled by opening the door 32 of vending machine 22 to access the dispenser. Since the dispenser 20 is preferably mounted on the door 32, opening the door brings the dispenser entirely out of the machine 22 for easy access. The latches 94 are disengaged from pins 98 and the bank 40 is pivoted upwardly. The bank 40 is releasably locked in its raised position with the hinged brace 86. (FIG. 6). The cover 91 is then pivoted on hinge **91*a* to expose the backs of the magazines. The guide members 72 are pulled to the bottom of their respective tracks 70, and their rollers 74 are secured in their catches 92 to hold the guide members out of passages 60, in the position shown in phantom in FIG. 6. The passages 60 in each magazine are then filled with the articles to be dispensed, such as packs P of gum. The sizes of the magazines may be adjusted by installing or removing inserts 62 in the passages. When the magazines are sufficiently filled, the guide members 72 are released from the catches 92 and allowed to slide in the tracks 70 toward the dispensing portion 46, urging the packs P toward the dispensing portion of their respective magazines. The cover 91 is then pivoted closed, with magnet 91*g* retaining the cover 91 against the back of the bank 40. The hinged brace 86 is then collapsed, and the bank 40 is allowed to pivot downwardly. The channel members 128, which face forwardly, automatically receive the eccentric drive members 118 to drivingly connect the drive members to the linkage 122, without any special connection step. When the bank 40 is in its normal operational position, it is resecured with latches 94**.

The door 32 of the vending machine 22 is then closed and the vending machine 22 is ready for operation. A customer deposits coins or otherwise registers credit, and after establishing sufficient credit, makes a selection of the desired article. If the customer selects an article contained in the dispenser, the selection means sends a control signal that activates the appropriate motor 112. As the motor 112 turns, the eccentric drive member 118 rotates, moving generally upwardly. This upward movement of the drive member 118 is transmitted via the channel 128 to the plate 124, causing the plate to move upwardly. The upward movement of plate 124 is transmitted via link 134 to ejector member 108, causing the ejector member to move upwardly. The top face of the ejector member 108 engages the bottom of the pack P′ at the top of the magazine, and pushes it upwardly out of the magazine through opening 100. Because of friction, the next adjacent pack P″ may also be pushed at least partially out of the magazine, although the portions of the magazine surrounding the opening 100 and the flap member 102 act to prevent the adjacent pack from being pushed far out of the magazine. When the drive member 118 has reached the top of its rotation, the ejector member 108 is at the top of its reciprocal stroke, extending completely through the magazine, and the pack P′ has been pushed entirely out of the magazine.

As the motor 112 continues to operate, the eccentric drive member 118 continues to rotate, moving downwardly, pulling plate 124 and thus ejector member 108 downwardly. The concave gripper surface 110 engages the adjacent pack P″ and pulls the pack back into the magazine as the ejector member 108 moves downwardly (see FIG. 9). When the adjacent pack P″ is firmly seated against the front 48 of the magazine, it cannot move downwardly any more. The concave gripping surface 110 on the ejector member then cams the pack P″ outwardly, out of engagement with the ejector member. As the adjacent pack P″ is pulled inwardly, the flap member 102, under the bias of spring 104, pivots forwardly, pushing the ejected pack P forwardly, into the bin 34. The ejector member 108 eventually returns to its position entirely below the ejection portion 46 of the magazine, and the guide member 72, under the bias of spring 78, urges the adjacent pack P″ into the position above the ejector member 108 formerly occupied the ejected pack P′. The magazine is thus ready to dispense another pack.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In a merchandise vending machine of the type comprising a cabinet, a delivery bin at the front of the cabinet, near the bottom, and means in the cabinet above the bin for dispensing merchandise to the bin, the improvement comprising:

an auxiliary article dispenser in the cabinet at the rear of the bin and below the merchandise dispensing means, the dispenser comprising a bank of at least one generally inverted-J shaped magazines for holding articles, each magazine having a generally vertically extending straight portion and a forwardly extending curved dispensing portion having an opening in the top;

means for urging articles in the magazine upwardly toward the curved dispensing portion;

means for ejecting articles one at a time from the top of the dispensing portion of the magazine, comprising an ejector member mounted for reciprocal motion generally transverse to the magazine to push an article upwardly out the opening in the top of the magazine, and means for reciprocating the ejector member comprising a motor, an eccentric drive member, driven by the motor, which orbits in a generally vertical plane, and a linkage connected to the eccentric drive member and the ejector so that movement of the drive member reciprocates the ejector member the linkage comprising a generally horizontal channel adapted to receive the drive member, the channel transmitting vertical movement of the drive member to the linkage while accommodating lateral movement of the drive member resulting from its orbital motion.

2. The improved vending machine according to claim 1 wherein the eccentric drive member extends generally rearwardly from the front of the cabinet and the channel faces generally forwardly to receive the eccentric drive member therein.

3. In a merchandise vending machine of the type comprising a cabinet, a delivery bin at the front of the cabinet, near the bottom, and means in the cabinet above the bin for dispensing merchandise to the bin, the improvement comprising:

an auxiliary article dispenser in the cabinet at the rear of the bin and below the merchandise dispensing means, the dispenser comprising a bank of at least one generally inverted-J shaped magazines for holding articles, each magazine having a generally vertically extending straight portion and a forwardly extending curved dispensing portion having an opening in the top;

means for urging articles in the magazine upwardly toward the curved dispensing portion;

means for ejecting articles one at a time from the top of the dispensing portion of the magazine, the ejecting means comprising an ejector member mounted for reciprocal motion generally transverse to the magazine to push an article upwardly out the opening in the top of the magazine, and means for reciprocating the ejector member; and a flap member pivotally mounted on the top of the magazine, and means for biasing the flap member to pivot generally forwardly to urge an article ejected from the top of the magazine generally forwardly, into the bin.

4. In a merchandise vending machine of the type comprising a cabinet, a delivery bin at the front of the cabinet, near the bottom, and means in the cabinet above the bin for dispensing merchandise to the bin, the improvement comprising:

an auxiliary article dispenser in the cabinet at the rear of the bin and below the merchandise dispensing means, the dispenser comprising a bank of at least one generally inverted-J shaped magazines for holding articles, each magazine having a generally vertically extending straight portion and a forwardly extending curved dispensing portion, the top of the dispensing portion having an opening therein;

means for urging articles in the magazine upwardly toward the curved dispensing portion;

means for ejecting articles one at a time from the top of the dispensing portion of the magazine, the ejecting means comprising an ejector member mounted for reciprocal motion generally transverse to the magazine to push an article upwardly out the opening in the top of the magazine, and means for reciprocating the ejector member; the ejector member comprising gripper means for gripping one article displaced from the magazine during the ejection of another article, and pulling the one article back into the magazine on the return stroke of the ejector member.

5. The improved vending machine according to claim 4 wherein the gripper means comprises a concave curved gripping surface adapted to engage an article to pull it back into the magazine, the gripper surface including camming means for disengaging the article when the article has been returned to the magazine.

6. An auxiliary article dispenser for use in a vending machine of the type comprising a cabinet, a merchandise delivering bin at the front of the cabinet, and means in the cabinet above the bin for dispensing the merchandise to the bin, the dispenser comprising:

a bank of at least one generally inverted-J shaped magazines for holding articles, each magazine having a generally vertically extending straight portion and a forwardly extending curved dispensing portion having an opening in the top, the bank adapted to be mounted in the cabinet with the straight portions of the magazines extending generally vertically behind the bin and the curved dispensing portions of the magazines extending over a top edge of a back wall of the bin;

means for urging articles in the magazines upwardly toward the curved dispensing portion; and means for ejecting articles one at a time from the top of the dispensing portion of the magazines, the ejecting means comprising an ejector member mounted for reciprocal motion generally transverse to the magazine to push an article upwardly out the opening in the top of the magazine, and means for reciprocating the ejector member comprising a motor, an eccentric drive member driven by the motor in an orbital path in a generally vertical plane, and a linkage connected to the eccentric drive member and the ejector so that movement of the drive member reciprocates the ejector member, the linkage comprising a generally horizontal channel adapted to receive the drive member, the channel transmitting vertical movement of the drive member to the linkage while accommodating lateral movement of the drive member resulting from its orbital motion.

7. The auxiliary dispenser according to claim 6 wherein the eccentric drive member extends generally rearwardly from the front of the cabinet and the channel faces generally forwardly to receive the eccentric drive member therein.

8. An auxiliary article dispenser for use in a vending machine of the type comprising a cabinet, a merchandise delivering bin at the front of the cabinet, and means in the cabinet above the bin for dispensing the merchandise to the bin, the dispenser comprising:

a bank of at least one generally inverted-J shaped magazines for holding articles, each magazine having a generally vertically extending straight portion and a forwardly extending curved dispensing portion having an opening in the top, the bank adapted to be mounted in the cabinet with the straight portions of the magazines extending generally vertically behind the bin and the curved dispensing portions of the magazines extending over a top edge of a back wall of the bin;

means for urging articles in the magazines upwardly toward the curved dispensing portion;

means for ejecting articles one at a time from the top of the dispensing portion of the magazines, the ejecting means comprising an ejector member mounted for reciprocal motion generally transverse to the magazine to push an article upwardly out the opening in the top of the magazine, and means for reciprocating the ejector member; and a flap member pivotally mounted on the top of each magazine, and means for biasing the flap member to pivot generally forwardly to urge an article ejected from the top of a magazine generally forwardly, into the bin.

9. An auxiliary article dispenser for use in a vending machine of the type comprising a cabinet, a merchandise delivering bin at the front of the cabinet, and means in the cabinet above the bin for dispensing the merchandise to the bin, the dispenser comprising:

a bank of at least one generally inverted-J shaped magazines for holding articles, each magazine having a generally vertically extending straight portion and a forwardly extending curved dispensing portion having an opening in the top, the bank adapted to be mounted in the cabinet with the straight portions of the magazines extending generally vertically behind the bin and the curved dispensing portions of the magazines extending over a top edge of a back wall of the bin;

means for urging articles in the magazines upwardly toward the curved dispensing portion; and means for ejecting articles one at a time from the top of the dispensing portion of the magazines, the ejecting means comprising an ejector member mounted for reciprocal motion generally transverse to the magazine to push an article upwardly out the opening in the top of the magazine, and means for reciprocating the ejector member, the ejector member comprising gripper means for gripping an article displaced from the magazine during the ejection of another article, and pulling the article back into the magazine on the return stroke of the ejector member.

10. The auxiliary dispenser according to claim 9 wherein the gripper means comprises a concave curved gripping surface adapted to engage an article to pull it back into the magazine, the gripper surface including camming means for disengaging the article when the article has been returned to the magazine.

* * * * *